(12) United States Patent
Imai

(10) Patent No.: US 12,169,135 B2
(45) Date of Patent: Dec. 17, 2024

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 175 days.

(21) Appl. No.: 17/687,457

(22) Filed: Mar. 4, 2022

(65) Prior Publication Data
US 2022/0291009 A1 Sep. 15, 2022

(30) Foreign Application Priority Data
Mar. 9, 2021 (JP) ................................. 2021-037808

(51) Int. Cl.
| | |
|---|---|
| G01C 21/36 | (2006.01) |
| G01C 21/00 | (2006.01) |
| G01C 21/30 | (2006.01) |
| H04W 4/02 | (2018.01) |
| H04W 4/029 | (2018.01) |

(52) U.S. Cl.
CPC ......... *G01C 21/3638* (2013.01); *G01C 21/30* (2013.01); *G01C 21/3844* (2020.08); *H04W 4/025* (2013.01); *H04W 4/029* (2018.02)

(58) Field of Classification Search
CPC ................ G01C 21/3638; G01C 21/30; G01C 21/3844; H04W 4/025; H04W 4/029; H04W 4/026; H04W 4/38
See application file for complete search history.

(56) References Cited

U.S. PATENT DOCUMENTS

| | | | | |
|---|---|---|---|---|
| 2020/0033463 A1* | 1/2020 | Lee | .......................... | G01S 11/06 |
| 2020/0103529 A1* | 4/2020 | Yeon | ..................... | G05D 1/0238 |
| 2020/0134866 A1* | 4/2020 | Kitaura | ...................... | G06T 7/74 |
| 2020/0309542 A1* | 10/2020 | Haug | ................... | G05D 1/0236 |
| 2021/0365040 A1* | 11/2021 | Tomono | ................... | B25J 11/00 |

OTHER PUBLICATIONS

Mur-Artal, et al., ORB-SLAM2: An Open-Source SLAM System for Monocular, Stereo and RGB-D Cameras, IEEE Transactions on Robotics, vol. 33(5) 1255-1262, Jun. 2017.

* cited by examiner

*Primary Examiner* — Sahar Motazedi

(74) *Attorney, Agent, or Firm* — Canon U.S.A., Inc. IP Division

(57) ABSTRACT

Provided is an information processing method for generating accurate map data by loop closing even when map elements where a loop is detected in a real space are close to each other. The method includes selecting a map elements group including at least one map element on each movement path, the at least one map element including sensor information included in each map element used to detect that the moving object has reached a location near a point a plurality of times, acquiring a relative position and orientation of at least one set of map elements in the map elements group, acquiring a relative position and orientation of the sensor between map elements corresponding to each movement path where the moving object has reached the location near the point the plurality of times, and correcting position and orientation information about the sensor included in each of the map elements.

12 Claims, 12 Drawing Sheets

INFORMATION PROCESSING APPARATUS, INFORMATION PROCESSING METHOD, AND STORAGE MEDIUM

BACKGROUND

Field of the Disclosure

The present disclosure relates to a technique for creating three-dimensional map information about an environment in which a moving object moves.

Description of the Related Art

An autonomous moving object, such as an automated guided vehicle (AGV), is used in factories and distribution warehouses. A simultaneous localization and mapping (SLAM) technique using a camera or a laser range scanner (laser range finder, laser imaging detection and ranging (LIDAR)) as a sensor is known as a method for estimating a position and orientation of such an AGV and creating electronic map data used for estimation. The position and orientation estimation uses a three-dimensional map representing an environment in which image features detected from image information and three-dimensional positional information about the image features measured based on the image features are used as map elements.

Mur-Artal, R., & Tardos, J. D. ORB-SLAM2: An Open-Source SLAM System for Monocular, Stereo and RGB-D Cameras, IEEE Transactions on Robotics, vol. 33(5) 1255-1262 discusses what is called a loop closing technique, i.e., a technique for, in processing for generating map data by moving a moving object having a sensor mounted thereon, recognizing a correspondence between measurement points located at close positions in a real space based on information about each measurement point acquired by the sensor and correcting a difference in the position and orientation of the moving object in the map data based on a result of recognition.

However, in the method discussed in Mur-Artal, R., & Tardos, J. D. ORB-SLAM2: An Open-Source SLAM System for Monocular, Stereo and RGB-D Cameras, IEEE Transactions on Robotics, vol. 33(5) 1255-1262, a relative position and orientation of each map element between measurement points where a loop is detected is calculated only between measurement points that are close to each other in the real space. Accordingly, the accuracy of the calculated relative position and orientation is not sufficient, which makes it difficult to achieve highly accurate position and orientation estimation using the map data (three-dimensional map information) subjected to loop closing processing.

SUMMARY

The present disclosure has been made in view of the above-described issue and is directed to generating map data with which highly accurate position and orientation estimation can be achieved.

According to an aspect of the present disclosure, an information processing apparatus includes an acquisition unit configured to acquire three-dimensional map information including a plurality of map elements corresponding to a movement path of a moving object, each of the plurality of map elements including sensor information obtained by a sensor being mounted on the moving object and measuring an environment, and position and orientation information about the sensor, the position and orientation information being estimated based on the sensor information, a detection unit configured to detect that the moving object has reached a location near a certain point a plurality of times based on the sensor information included in each of the map elements, a selection unit configured to select map elements for a map elements group including at least one map element on each movement path, the at least one map element including sensor information obtained by measuring an environment partially common to an environment measured to obtain the sensor information included in each of the map elements used by the detection unit to detect that the moving object has reached the location near the certain point the plurality of times, a first position and orientation acquisition unit configured to acquire a relative position and orientation of at least one set of map elements in the map elements group based on the sensor information included in the map elements group whose map elements have been selected by the selection unit, a second position and orientation acquisition unit configured to acquire a relative position and orientation of the sensor between the map elements corresponding to each movement path where the moving object has reached the location near the certain point the plurality of times, and a correction unit configured to correct the position and orientation information about the sensor included in each of the map elements corresponding to each movement path where the moving object has reached the location near the certain point the plurality of times based on the relative position and orientation acquired by the first position and orientation acquisition unit and the relative position and orientation acquired by the second position and orientation acquisition unit.

Further features of various embodiments will become apparent from the following description of exemplary embodiments with reference to the attached drawings.

DESCRIPTION OF THE EMBODIMENTS

Figure 1:
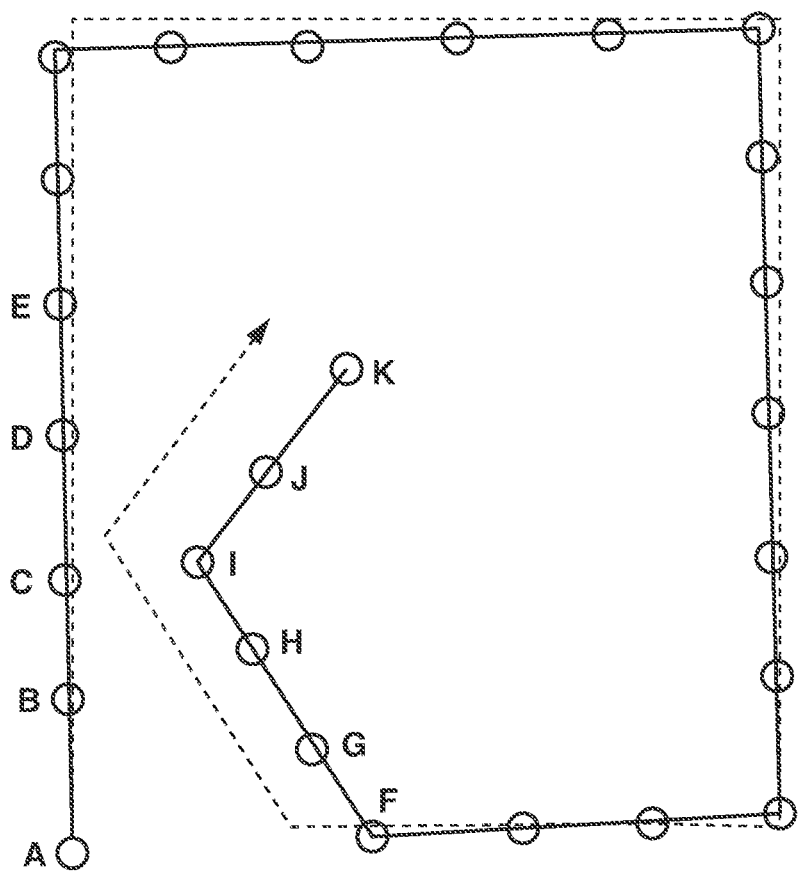
FIG. 1 illustrates an example of a movement path of a moving object and a state of map data before correction processing is performed according to a first exemplary embodiment.

Exemplary embodiments of the present disclosure will be described in detail below with reference to the drawings. The following exemplary embodiments are not intended to limit the claims, and not all combinations of features described in the following exemplary embodiments are essential to attain every embodiment.

An information processing apparatus, an information processing method, and a storage medium storing a computer program according to a first exemplary embodiment will be described in detail below with reference to the drawings.

The first exemplary embodiment illustrates an example where map data (hereinafter, the term "map data" is used as a term synonymous with "three-dimensional map information") that can be used for position and orientation estimation or autonomous traveling in an environment by a moving object having a sensor mounted thereon is corrected on an information processing apparatus provided independently of the moving object. In the first exemplary embodiment, a grayscale camera serving as an image capturing apparatus is used as the sensor.

The term "environment" used herein refers to an area in which the sensor moves and a three-dimensional space around the area. The term "position and orientation" used herein refers to values of six degrees of freedom obtained by combining three-dimensional positional information and orientation information with three degrees of freedom. The position and orientation in the three-dimensional space can be represented using a 4×4 affine matrix, and only rotation and translation among the properties of affine transformation are used. In a case where two affine matrices A and B representing the position and orientation are present, an affine matrix d representing a relative position and orientation (a difference in the position and orientation) between the affine matrix A and the affine matrix B can be obtained by integrating an inverse matrix of the affine matrix A with the affine matrix B. Similarly, the position and orientation (affine matrix) B can be obtained by integrating the relative position and orientation (affine matrix) d with the position and orientation (affine matrix) A.

(Map Data)

Map data (three-dimensional map information) to be corrected in the present exemplary embodiment includes at least one measurement point (hereinafter, the term "measurement point" is used as a term synonymous with "map element" and "key-frame"). Each measurement point includes sensor information (image data captured by the sensor) as information for measuring the position and orientation and detecting a loop, and position and orientation information about the sensor. In the case of creating the map data, measurement points are arranged at a predetermined interval along a movement path. The interval between the measurement points is set to a distance at which a sufficient base line length can be obtained when a stereo measurement or bundle adjustment is performed using the sensor information obtained at adjacent measurement points on a feature in the environment that is observed by the sensor in common. The feature in the environment may be a stationary object, such as a wall or a ceiling, having a feature that can be observed by the sensor. Although the interval between the measurement points is dependent on a distance to the feature in the environment or on a feature amount, in the present exemplary embodiment, it is assumed that a sufficient base line length is 1 m and the measurement points are arranged every meter as the sensor moves along the movement path.

(Bundle Adjustment)

Bundle adjustment processing is a method that is used to solve a problem of estimating parameters for a geometric model based on a correspondence relationship between image feature points extracted from multiple images, and is used to numerically solve a non-linear optimization problem. In the bundle adjustment processing, three-dimensional coordinates of each feature point are calculated based on the correspondence relationship between the feature points between input images. The calculated three-dimensional coordinates of each feature point are re-projected on an image plane, and a reprojection error to be calculated as a distance between a reprojected point and each feature point is calculated. Re-estimation is repeatedly performed to reduce the reprojection error, and the three-dimensional coordinates of each feature point and the position and orientation of each image (measurement point) can be more accurately estimated.

(Drift and Loop Closing)

A relationship between a position and orientation error (drift) that occurs when map data is generated and loop closing processing will now be described. Map data is generated by a repetition of processing of generating measurement points and estimating the current position and orientation using the measurement points. Accordingly, a difference in the position and orientation that occurs when measurement points are generated causes an error in a subsequent position and orientation estimation using the measurement points. Such errors are accumulated every time measurement points are repeatedly generated. The accumulated errors are referred to as a drift.

Figure 2:
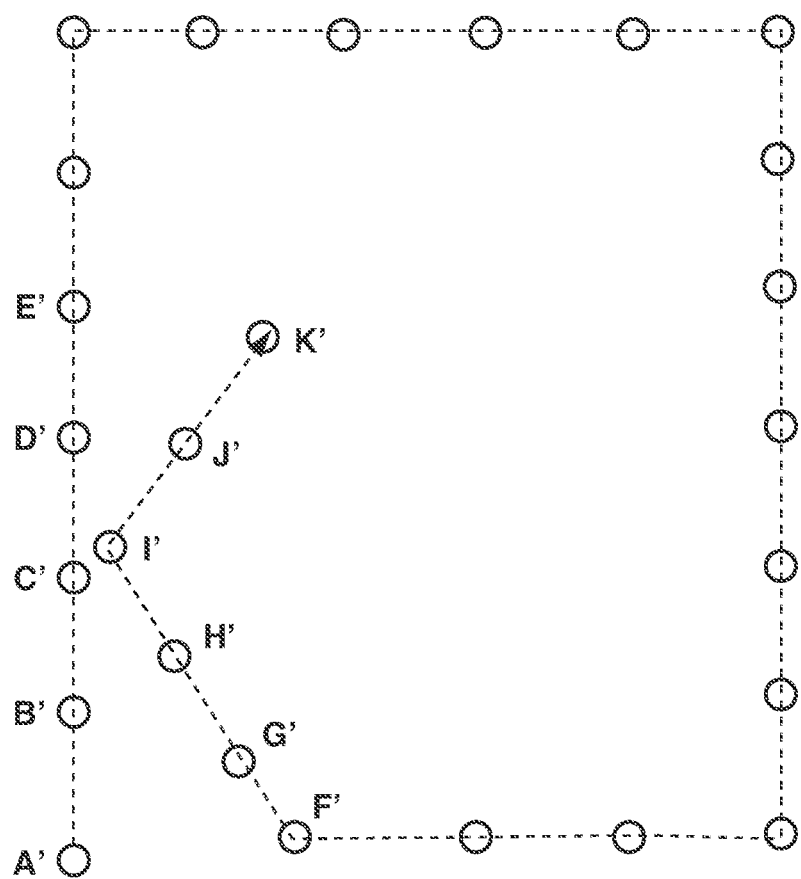
FIG. 2 illustrates a state where measurement points are arranged in ideal positions and orientations according to the first exemplary embodiment.

FIG. 1 schematically illustrates a relationship between measurement points generated in map data and a real movement path of a moving object on a plane. A solid line in FIG. 1 indicates a locus representing a position and orientation estimation result, and a dashed line indicates a locus representing a real position and orientation of the moving object that has moved. Each circle illustrated in FIG. 1 indicates a measurement point. The moving object starts from a measurement point A and generates measurement points B to K while traveling clockwise in the environment, and passes by a location near the measurement point C in a real space when the measurement point I is generated. In other words, the moving object reaches a point where the moving object has reached once. However, due to an effect of position and orientation errors (drift) accumulated each time a measurement point is arranged, the measurement point I and measurement points located near the measurement point I are each arranged in a relative position and orientation including an error as viewed from the measurement point C and measurement points near the measurement point C. Referring to FIG. 2, A' to K' each represent the position and orientation of each measurement point when there is no drift and the measurement points are ideally arranged.

Processing for correcting the position and orientation of the moving object and each element on map data in a case where the moving object revisits a certain point on the map data (loop of a movement path) to correct accumulated errors is referred to as loop closing. In the examples illustrated in FIGS. 1 and 2, a loop is detected between the measurement points C and I, and the position and orientation at measurement points other than the measurement points C and I are corrected so that the corrected position and orientation at the measurement point I substantially coincides I' and the consistency among the relative positions and orientations of the measurement points can be ensured.

In this regard, according to a conventional method, the relative position and orientation between the measurement points C and I is calculated based on the association between features based on sensor information observed by the sensor and the stereo measurement. Further, a loop is detected when it is determined that the positions of the measurement points C and I in the real space are sufficiently close to each other based on the calculated relative position and orientation. However, in this case, if the distance between the measurement points C and I in the real space is too small, it is difficult to obtain a sufficient base line length between the measurement points C and I, which may lead to deterioration in the accuracy of the relative position and orientation between the measurement points C and I. In this case, position and orientation correction processing results at measurement points other than the measurement points C and I in the loop are also inaccurate.

(Configuration of Information Processing Apparatus)

Figure 3:
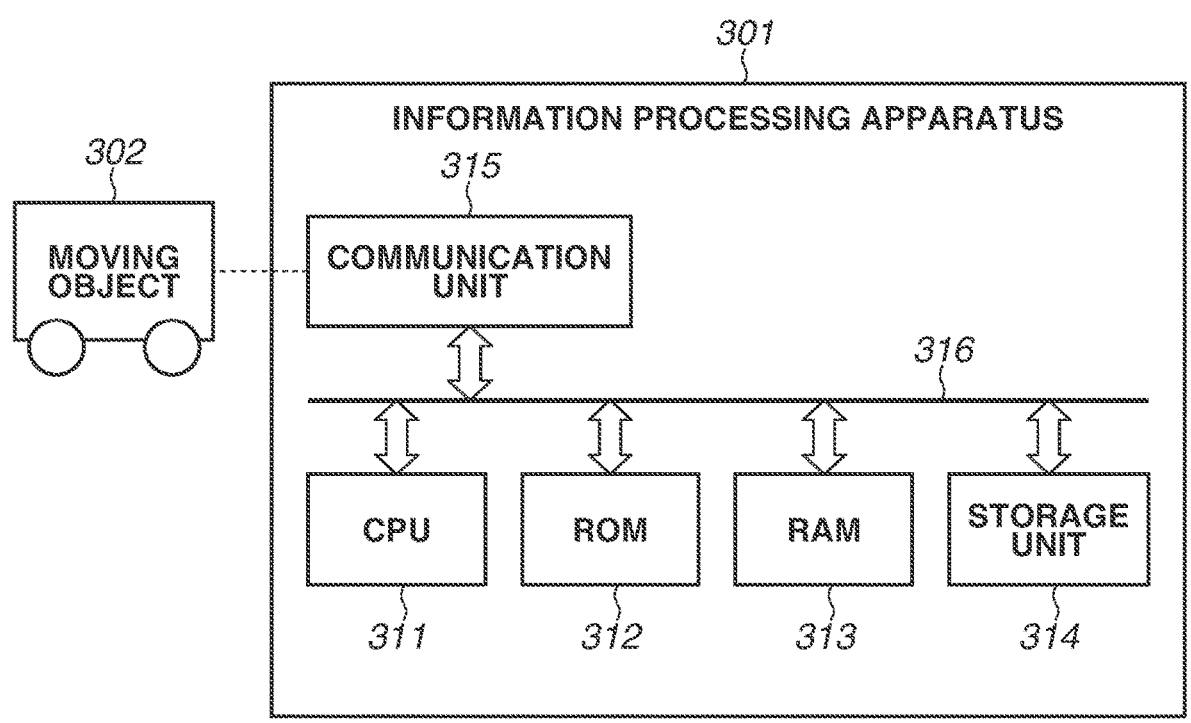
FIG. 3 is a block diagram illustrating a configuration of an information processing apparatus according to the first exemplary embodiment.

FIG. 3 is a block diagram illustrating an example of a configuration of an information processing apparatus 301 according to the present exemplary embodiment. The information processing apparatus 301 includes typical built-in functions of a personal computer (PC) apparatus. The information processing apparatus 301 includes a central processing unit (CPU) 311; a read-only memory (ROM) 312; a random access memory (RAM) 313; a storage unit 314, such as a hard disk drive (HDD) or a solid-state drive (SSD); a communication unit 315; and a system bus 316.

The CPU 311 executes an operating system (OS) and various computer programs stored in the ROM 312, the storage unit 314, or the like using the RAM 313 as a work memory, thereby controlling each unit via the system bus 316. The programs to be executed by the CPU 311 include programs for executing processing to be described below.

The information processing apparatus 301 is connected to a moving object 302 via the communication unit 315. The moving object 302 includes a sensor and a moving unit and has a function for creating map data while traveling in an environment based on an instruction from a user and transmitting the created map data to the information processing apparatus 301. The information processing apparatus 301 stores the map data received from the moving object 302 in the storage unit 314. Examples of the moving object 302 include an autonomous mobile robot (AMR), an automated guided vehicle (AGV), a self-driving car, a robot vacuum cleaner, a delivery robot, and a drone.

(Logical Configuration of Information Processing Apparatus)

Figure 4:
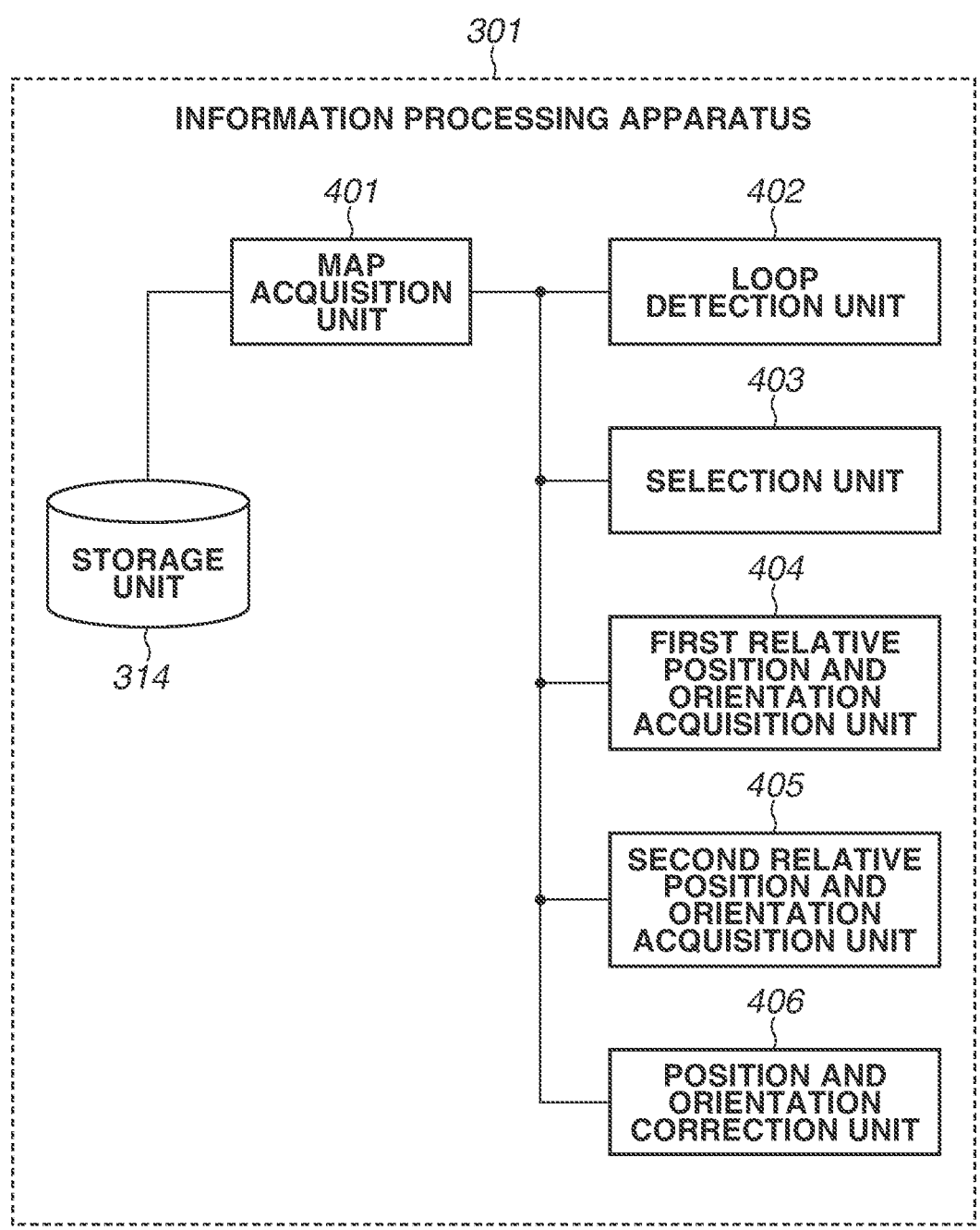
FIG. 4 is a block diagram illustrating a logical configuration of the information processing apparatus according to the first exemplary embodiment.

A logical configuration of the information processing apparatus 301 according to the present exemplary embodiment will be described below. Processing to be performed by each unit described below is implemented as software by the CPU 311 loading a computer program into the RAM 313 from the ROM 312 or the like and executing the program. FIG. 4 is a block diagram illustrating the logical configuration of the information processing apparatus 301.

A map acquisition unit 401 acquires map data from the storage unit 314 and loads the map data into the RAM 313.

A loop detection unit 402 compares two measurement points on the map data and detects a loop of a movement path of the sensor. Specifically, first, a similarity in sensor information (image) between two measurement points is calculated using a known Bag-of-Words (BoW) model, and it is determined whether the similarity is more than or equal to a certain value. Although the term "loop" is used in the present exemplary embodiment, a loop is detected not only when the moving object 302 has moved circularly, but also when the moving object 302 has reached (revisited) a location near a certain point a plurality of times in general. Motions on the movement path may include traveling in a straight line, making a curvilinear motion and making a turning operation, or may include a combination of advancing, receding, and transverse motions. The moving object 302 revisits a location near a certain point not only when the moving object 302 travels in opposite traveling directions, but also when extensions from the movement paths to which the respective measurement points (such as the measurement points C and I illustrated in FIG. 1) belong intersect with each other.

Next, the loop detection unit 402 extracts image feature points from images at both measurement points, and estimates a relative position and orientation between the measurement points (hereinafter the term "between the measurement points" is used as a term synonymous with "between the map elements" in the present exemplary embodiment) based on a distribution of corresponding feature points on the images at both measurement points. If it is determined that the relative position and orientation is successfully calculated with a certain level of accuracy, the loop detection unit 402 determines that a loop is detected between the measurement points. In the example illustrated in FIG. 1, a loop is detected between the measurement points C and I.

However, for the reasons described above, the accuracy of the relative position and orientation between measurement points calculated by the loop detection unit 402 in this case may be insufficient to achieve highly accurate map correction processing.

Accordingly, the information processing apparatus 301 has the following configuration for accurately calculating the relative position and orientation between measurement points near a location where a loop is detected.

A selection unit 403 selects a plurality of measurement points to be used by a first relative position and orientation acquisition unit 404 from two measurement points where the loop is detected by the loop detection unit 402 and measurement points near the two measurement points on the movement path. In this case, the selection unit 403 selects at least one measurement point from each movement path (movement paths to which two measurement points where a loop is detected belong) where the moving object 302 has reached the points forming the loop. The selection unit 403 also selects the measurement points to include at least one measurement point other than the measurement points where the loop is detected by the loop detection unit 402. In the example illustrated in FIG. 1, when a loop is detected between the measurement points C and I, the selection unit 403 selects at least one measurement point from the movement path formed of the measurement points A to E and at least one measurement point from the movement path formed of the measurement points F to K, and selects, from among the selected measurement points, a plurality of measurement points including at least one measurement point other than the measurement points C and I.

The first relative position and orientation acquisition unit 404 calculates a relative position and orientation between measurement points for at least one set of measurement points among the plurality of measurement points selected by the selection unit 403 based on sensor information at the plurality of measurement points selected by the selection unit 403. In this case, the at least one set of measurement points is a set of measurement points selected from a different movement path where the moving object 302 has reached the points forming a loop.

As a method for calculating the relative position and orientation for each set of measurement points, the association of feature points observed in sensor information at both measurement points and the stereo measurement are used as in the conventional method performed between measurement points.

To extract the feature points in images as described above, for example, a known features from accelerated segment test (FAST) algorithm is used.

A second relative position and orientation acquisition unit 405 calculates a relative position and orientation between two measurement points based on position and orientation information about any two measurement points on map data. The relative position and orientation between adjacent measurement points on all the movement paths on the map data are calculated.

A position and orientation correction unit 406 corrects the position and orientation information about each measurement point based on the relative position and orientation between measurement points acquired by the first relative position and orientation acquisition unit 404, the relative position and orientation between measurement points acquired by the second relative position and orientation acquisition unit 405, and the position and orientation of at least one reference measurement point. The correction processing is performed to reduce a difference between each piece of acquired relative position and orientation information and the corrected relative position and orientation between measurement points.

(Map Data Correction Processing)

Figure 5:
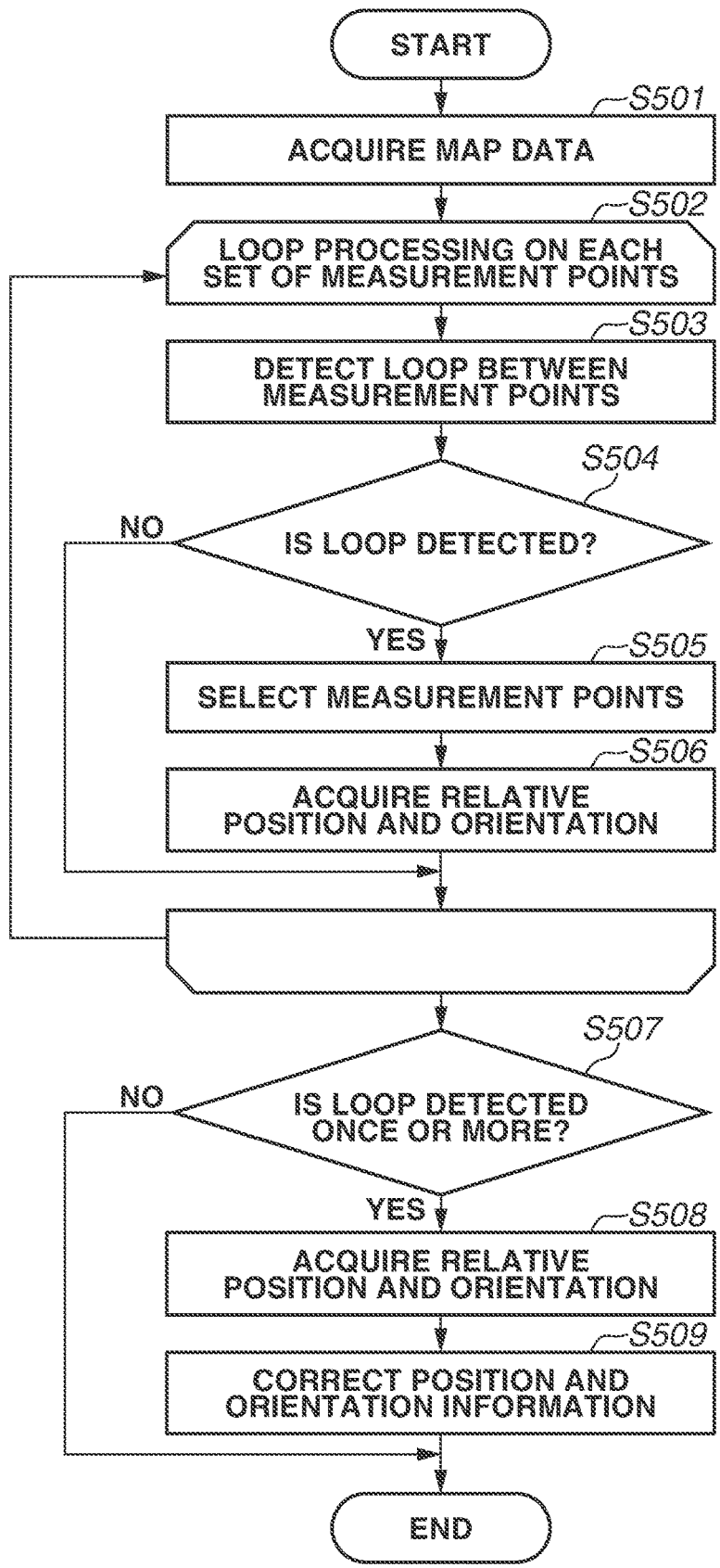
FIG. 5 is a flowchart illustrating a procedure of a map correction method according to the first exemplary embodiment.
Figure 6:
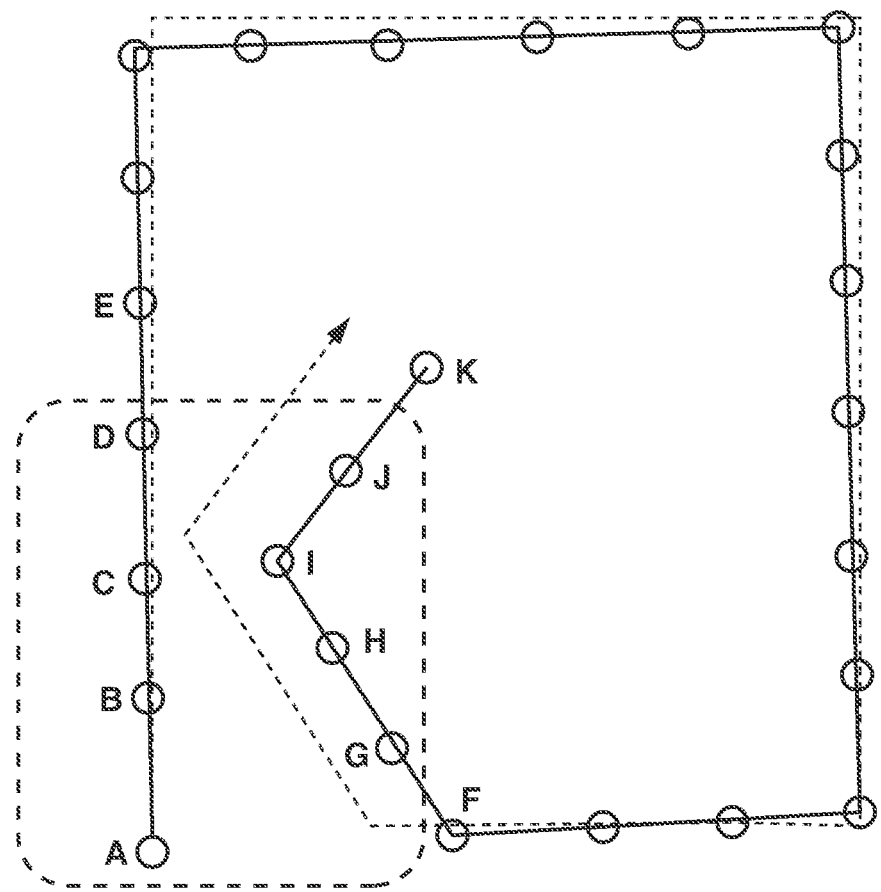
FIG. 6 illustrates an example of measurement point selection results according to the first exemplary embodiment.
Figure 7:
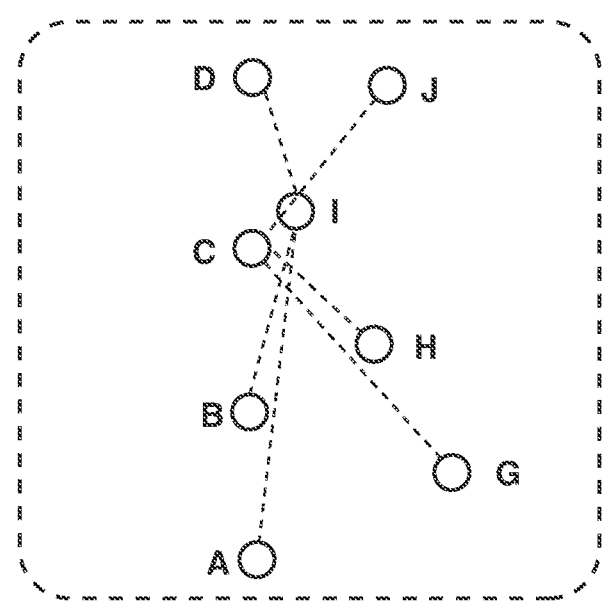
FIG. 7 illustrates an example of first relative position and orientation acquisition processing according to the first exemplary embodiment.

Then, a map data correction method related to an information processing method using the information processing apparatus 301 according to the present exemplary embodiment will be described with reference to FIGS. 5 to 7. Hereinafter, the flowchart illustrated in FIG. 5 is described as being implemented by the CPU 311 executing a control program.

In S501, the map acquisition unit 401 acquires map data from the storage unit 314 and loads the acquired map data into the RAM 313. The following description is provided using an example where the map data in the state illustrated in FIG. 1 is loaded.

S502 is a loop control in which processing of subsequent S503 to S506 is repeatedly performed on all sets of two measurement points on the map data. The processing of S503 to S506 is described using an example where the processing is performed on the set of the measurement points C and I in the repetitive processing.

In S503, the loop detection unit 402 determines whether the set of measurement points of interest forms a loop. In this case, the sensor information at the measurement point C is compared with the sensor information at the measurement point I, and the relative position and orientation is calculated, thereby the loop detection unit 402 detects that a loop is formed between the measurement points C and I. The calculated relative position and orientation is not used in subsequent processing because the calculated relative position and orientation may not be sufficiently accurate.

S504 is a branch based on whether a loop is detected in S503. If a loop is detected (YES in S504), processing of subsequent S505 and S506 is performed. If a loop is not detected (NO in S504), the processing returns to S502 to perform the processing on the next set of measurement points. In this case, since a loop is detected between the measurement points C and I (YES in S504), the processing proceeds to S505.

In S505, the selection unit 403 selects a measurement points group for calculating an accurate relative position and orientation between measurement points from both sides of the movement path forming the loop. FIG. 6 illustrates an example of a measurement point selection result according to the present exemplary embodiment.

First, the selection unit 403 selects measurement points where a loop is detected and measurement points adjacent to the measurement points on each movement path. In the example illustrated in FIG. 6, the measurement points C and I where a loop is detected, the measurement points B and D adjacent to the measurement point C, and the measurement points H and J adjacent to the measurement point I are selected. Next, it is determined whether a longest distance between the selected measurement points exceeds a predetermined distance on each movement path. The predetermined distance is set to twice a sufficient base line length (2 m in this case). If the longest distance is less than the predetermined distance, measurement points adjacent to the selected measurement points are additionally selected until the longest distance exceeds the predetermined distance. In the example illustrated in FIG. 6, the distance between the measurement points B and D is less than 2 m on the movement path on the side of the measurement point C, and thus the measurement point A is additionally selected. The distance between the measurement points A and D exceeds 2 m, and thus the selection of measurement points on the movement path on the side of the measurement point C is completed. Similarly, the measurement point G is additionally selected on the movement path on the side of the measurement point I. Eventually, the selection unit 403 selects the measurement points A to D and the measurement points G to J and then completes the selection processing.

Thus, a measurement points group is selected such that the maximum distance between the measurement points selected by the selection unit 403 is more than or equal to a distance value of the base line length. The measurement points group includes the measurement points for measuring respective environments that are partially common to each other. The measurement points E and K are not selected because it is sufficient to select the measurement points located at a distance exceeding the base line length. This is because, if the number of measurement points to be selected is increased more than necessary, a load on subsequent processing increases.

In this case, the real relative position and orientation between the measurement points C and I is unknown. However, since the distance between the measurement points A and D exceeds 2 m, the base line length of 1 m or more can be ensured between any one of the measurement points A to D and the measurement point I regardless of the real position and orientation at the measurement point I. Similarly, the base line length of 1 m or more can be ensured between the measurement point C and any one of the measurement points G to J.

In the selection of the measurement points, one or both of the measurement points C and I where a loop is detected may be excluded from the selection target. For example, to reduce the processing load, only the measurement points A, D, G, and J that can satisfy the predetermined distance on each movement path may be included in the selection result, and the measurement points B, C, I, and H may be excluded from the selection target. Alternatively, only the measurement point C may be selected from the movement path on the side of the measurement point C, and the measurement points G and J that can satisfy the predetermined distance may be selected from the movement path on the side of the measurement point I. In this case, a sufficient base line length can be obtained between the measurement points C and G or between the measurement points C and J. Instead of using the method of additionally selecting measurement points one by one, a method in which measurement points located at a distance that is more than or equal to the predetermined distance and less than or equal to another predetermined distance are collectively selected may be used.

In S506, the first relative position and orientation acquisition unit 404 calculates the relative position and orientation between the plurality of measurement points (map elements group) selected in S505. FIG. 7 illustrates a state where the relative position and orientation between the plurality of measurement points in a selected range is calculated. In this case, six sets of relative position and orientation are calculated between the measurement point C and each of the measurement points G, H, and J and between each of the measurement points A, B, and D and the measurement point I.

The processing of S505 and S506 is performed on all of the sets of measurement points where a loop is detected in S503 among the sets of measurement points on which the processing is repeatedly performed in S502.

Hereinafter, the relative position and orientation between the measurement points calculated in S506 is a set of unique relative positions and orientations calculated in S506 in the repetitive processing. If a plurality of loops is detected in the processing and a set of measurement points for which the relative position and orientation has previously been calculated in S506 appears, calculation for the set of measurement points is omitted.

S507 is a branch based on whether a loop is detected once or more in S503. If a loop is detected (YES in S507), processing of subsequent S508 and S509 is performed. If a loop is not detected (NO in S507), the processing is terminated. In this case, since a loop is detected between the measurement points C and I (YES in S507), the processing proceeds to S508.

In S508, the second relative position and orientation acquisition unit 405 calculates the relative position and orientation between adjacent measurement points on all movement paths on the map data. In the example illustrated in FIG. 6, relative positions and orientations are sequentially calculated in the order of the relative position and orientation between the measurement points A and B, the relative position and orientation between the measurement points B and C, etc., up to the relative position and orientation between the measurement points J and K. Each relative position and orientation is calculated by acquiring position and orientation information about each measurement point as an affine matrix from the map data and integrating the inverse matrix of one of the affine matrices with the other affine matrix.

In S509, the position and orientation correction unit 406 corrects the position and orientation information about each measurement point based on the relative positions and orientations acquired in S506 and S508. Specifically, first, the position and orientation correction unit 406 acquires the relative position and orientation with a sufficient distance between measurement points as the base line length from among the relative positions and orientations between measurement points calculated in S506. Next, the position and orientation correction unit 406 acquires all of the relative positions and orientations between measurement points calculated in S507. Then, the position and orientation correction unit 406 uses the position and orientation at each measurement point other than the measurement point based on which the position and orientation is calculated as parameters to minimize a difference between the corrected relative position and orientation between measurement points and the relative positions and orientations acquired in S506 and S508. To minimize the difference in the relative position and orientation, optimization processing using a technique, such as a known Newton's method or Levenberg-Marquardt method, is performed. In this case, the measurement point A generated as a starting point of the movement path on the map data is used as the reference for the position and orientation, and the position and orientation at the measurement point A is fixed at values acquired based on the map data.

The above-described processing makes it possible to achieve highly accurate calculation of the relative position and orientation between measurement points near a location where a loop is detected, and to correct the position and orientation at each measurement point with high accuracy using the relative position and orientation.

(Effects of First Exemplary Embodiment)

The above-described processing according to the present exemplary embodiment makes it possible to generate map data with which highly accurate position and orientation estimation can be achieved even in a case where a loop is detected between measurement points that are close to each other in the real space.

The first exemplary embodiment described above illustrates the example where the map data created by the moving object 302 having a sensor mounted thereon is corrected on the information processing apparatus 301 that is provided independently of the moving object 302. A second exemplary embodiment illustrates an example where a moving object having an information processing apparatus mounted thereon creates map data while traveling in an environment and the moving object performs map correction processing in parallel with measurement point generation processing on the map data. The second exemplary embodiment also illustrates an example where a pose graph on which not only measurement points but also information about feature points in the environment and relative position and orientation information between measurement points are recorded is used as the map data. Hereinafter, the term "measurement point" is used as a term synonymous with "map element" and "key-frame".

(Map Data)

Environment map data used to calculate the position and orientation in the present exemplary embodiment includes a plurality of feature points in the environment, at least one measurement point, and a pose graph. Each of the feature points in the environment holds three-dimensional positional information. Each of the measurement points holds observation information about a feature point in the environment as well as sensor information and position and orientation information. The observation information is a list of sets of a feature point in the environment included in the sensor information (image) and two-dimensional coordinates of the feature point on the image. The two-dimensional coordinates on the image are information corresponding to the azimuth of the feature point in the environment as seen from the sensor. In the case of creating such map data, the relative position and orientation between measurement points is corrected, as needed, by bundle adjustment using a plurality of measurement points and feature point data in the environment observed at the plurality of measurement points, thereby highly accurate environment map data can be generated.

The pose graph is a simple graph on which each measurement point is illustrated as a node and the relative position and orientation between two measurement points is illustrated as an edge. Each of the measurement points is connected with at least one measurement point other than the measurement point with an edge. All measurement points on the map data are connected on the pose graph. The relative positions and orientations recorded on the pose graph in the present exemplary embodiment are values estimated by the above-described bundle adjustment.

(Configuration of Moving Object)

Figure 8:
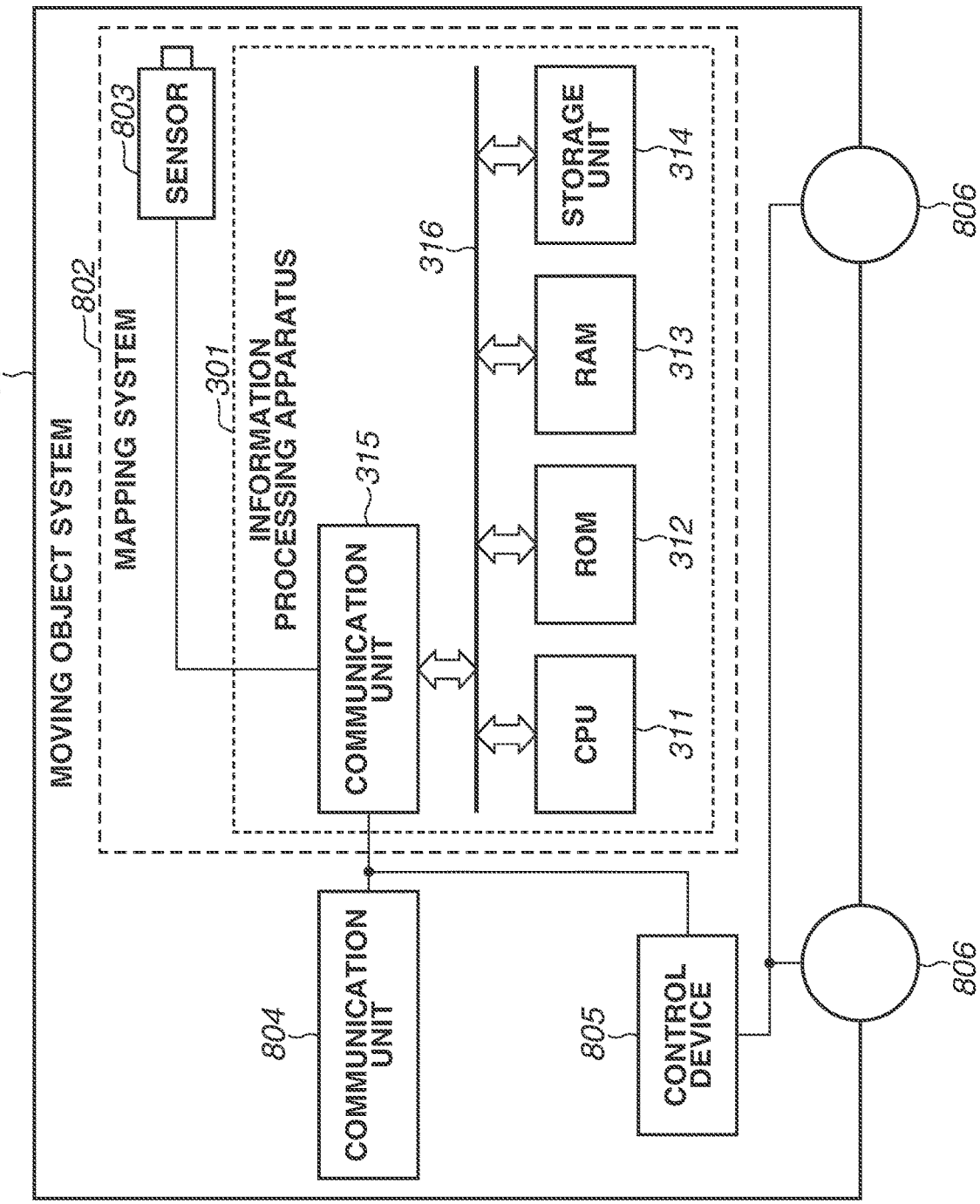
FIG. 8 is a block diagram illustrating a configuration of a moving object system according to a second exemplary embodiment.

FIG. 8 is a block diagram illustrating an example of a configuration of a moving object system 801 according to the present exemplary embodiment. The moving object system 801 includes a mapping system 802 including a sensor 803 and the information processing apparatus 301, a communication unit 804, a control device 805, and moving portions 806. A physical configuration of the information processing apparatus 301 is similar to that described in the first exemplary embodiment with reference to FIG. 3, and thus the description thereof is omitted.

The sensor 803 outputs sensor information obtained by measuring a surrounding environment. The sensor 803 is a stereo camera that is fixed in the front direction of the moving object and is capable of continuously acquiring grayscale luminance images. For convenience of explanation, it is assumed that internal parameters, such as a focal length and an angle of view of the camera, are known and an image is output in a state where an image distortion does not exist or is corrected. While it is assumed that the sensor 803 performs image capturing 30 times per second, the sensor 803 may perform image capturing at a different frame rate. Since the sensor 803 is fixed to the moving object system 801, the position and orientation values that can be easily converted are used.

The control device 805 controls driving of the moving portions 806. The control device 805 drives the moving portions 806 based on an instruction from a user outside the moving object via the communication unit 804, thereby allowing the moving object system 801 to travel or turn. The moving portions 806 are a plurality of tires that are partially or entirely connected to power.

The physical configuration and a logical configuration of the information processing apparatus 301 are similar to those described in the first exemplary embodiment with reference to FIGS. 3 and 4, and thus the descriptions thereof are omitted.

(Logical Configuration of Information Processing Apparatus)

Figure 9:
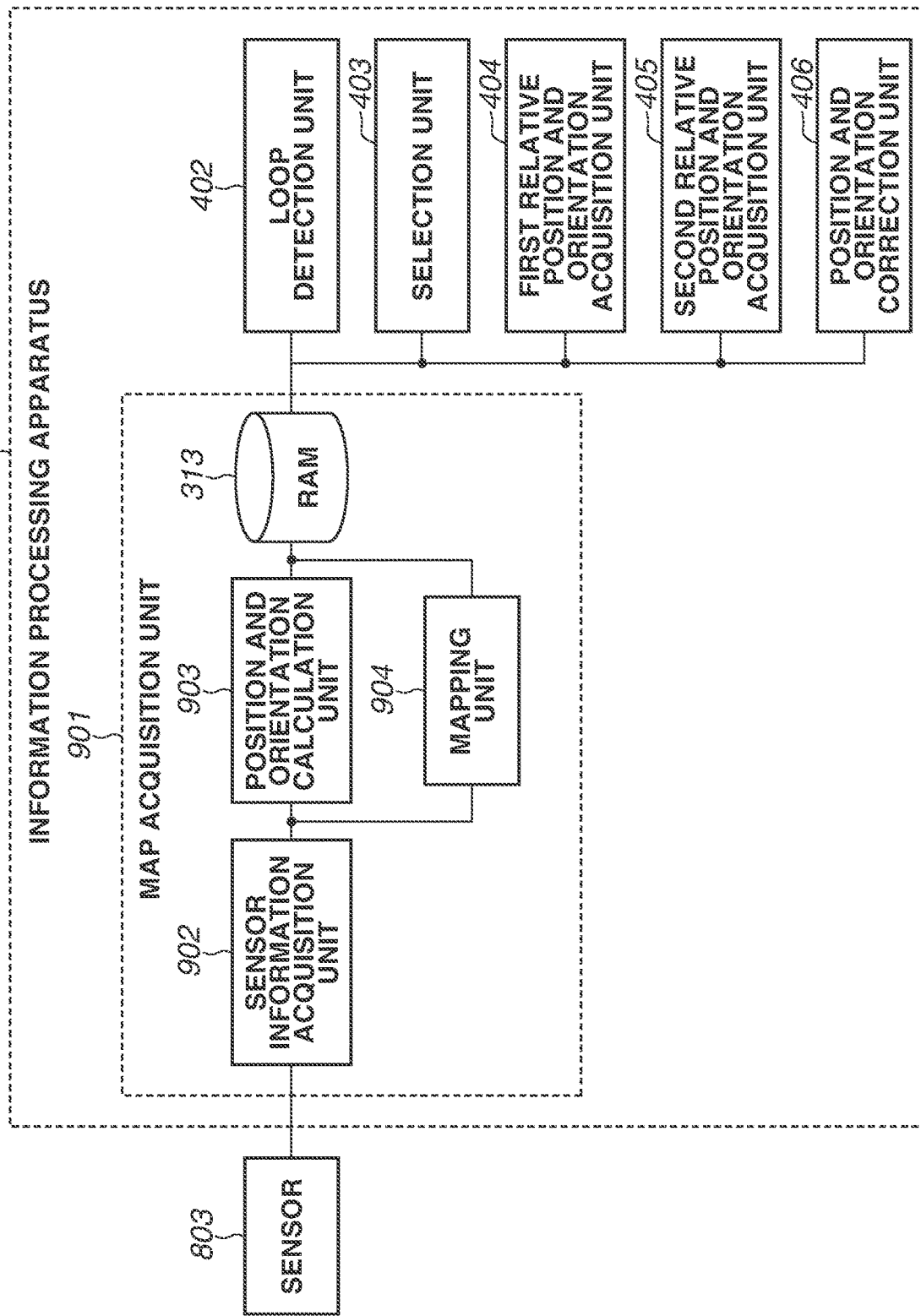
FIG. 9 is a block diagram illustrating a logical configuration of an information processing apparatus according to the second exemplary embodiment.

The logical configuration of the information processing apparatus 301 according to the present exemplary embodiment will be described with reference to FIG. 9.

The loop detection unit 402, the selection unit 403, the first relative position and orientation acquisition unit 404, the second relative position and orientation acquisition unit 405, and the position and orientation correction unit 406 are similar to those of the first exemplary embodiment, and thus the descriptions thereof are herein omitted.

A map acquisition unit 901 according to the present exemplary embodiment includes a sensor information acquisition unit 902, a position and orientation calculation unit 903, and a mapping unit 904.

The sensor information acquisition unit 902 continuously acquires sensor information (stereo image) from the sensor 803.

The position and orientation calculation unit 903 selects a measurement point near the sensor 803 from among the measurement points in the map data based on the stereo image acquired by the sensor information acquisition unit 902. Further, the position and orientation calculation unit 903 estimates the position and orientation of the sensor 803 based on a distribution of feature points on the image, feature points in the environment on the map data observed at the selected measurement point, or feature points tracked between the image in a current frame and the image in a previous frame.

The mapping unit 904 adds a measurement point to the map data using, as needed, the stereo image acquired by the sensor information acquisition unit 902 and the position and orientation information estimated by the position and orientation calculation unit 903. It may be desirable to add a measurement point, for example, when it is determined that the distance between the sensor 803 and each existing measurement point on the map data is more than or equal to a predetermined distance, which makes it difficult to estimate the position and orientation based on existing measurement points. The term "predetermined distance" used herein refers to a distance at which a sufficient base line length can be obtained between measurement points, as in the first exemplary embodiment. In the following description, the predetermined distance is set to 1 m as in the first exemplary embodiment.

In the case of adding a measurement point, the mapping unit 904 generates new feature point data in the environment based on an image feature point in the stereo image that is not associated with feature point data in the environment on the map data yet.

Further, the mapping unit 904 adds the relative position and orientation between the generated measurement point and the measurement points used for position and orientation estimation when the measurement point is generated to the pose graph on environment map data. The relative position and orientation used in this case is calculated by bundle adjustment using the generated measurement point, the measurement points used for position and orientation estimation when the measurement point is generated, and feature point data in the environment used in common for observation. Based on the relative position and orientation between generated measurement points and the relative position and orientation between the measurement point and the feature point data in the environment, the position and orientation of each of the generated measurement points and positional information about each feature point data in the environment are updated using the position and orientation of each measurement point used for position and orientation estimation when the measurement point is generated as a reference.

(Map Data Creation Processing)

Figure 10:
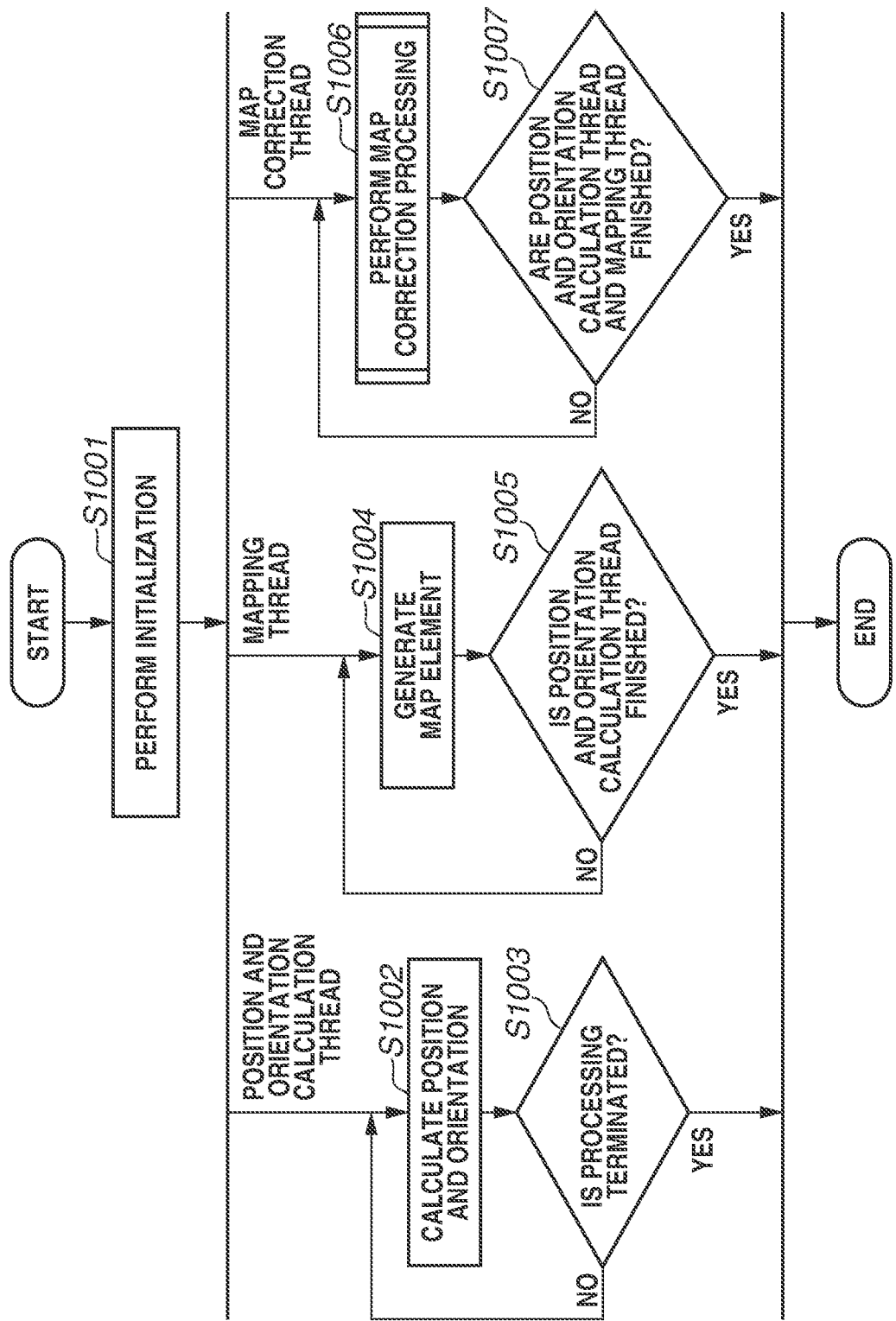
FIG. 10 is a flowchart illustrating a procedure of a mapping method according to the second exemplary embodiment.

A method for creating map data using the moving object system 801 will be described below. FIG. 10 is a flowchart illustrating a procedure of environment map data creation processing according to the present exemplary embodiment.

In S1001, the information processing apparatus 301 performs initialization. The information processing apparatus 301 constructs empty map data on the RAM 313 and generates a first measurement point (the measurement point A in FIG. 1) on the map data. The position of the first measurement point serves as an origin in the environment, and the orientation is set in a predetermined direction (e.g., in a Y-axis positive direction). The current position and orientation of the position and orientation calculation unit 903 is initialized with the position and orientation at the first measurement point.

In the subsequent processing, three threads, i.e., a position and orientation calculation thread, a mapping thread, and a map correction thread, are executed in parallel. S1002 and S1003 are processing executed in the position and orientation calculation thread.

In S1002, the position and orientation calculation unit 903 acquires an image from the sensor 803, and updates the current position and orientation information based on the image and a measurement point closest to the current position and orientation on the map data. Specifically, the information processing apparatus 301 obtains the current position and orientation information by applying a difference in the position and orientation between the image associated with the measurement point and the latest image which is an image captured at the current position to the position and orientation information associated with the referenced measurement point. The difference in the position and orientation between the images is estimated based on a distribution of feature points on both of the images. The feature points are tracked between the latest image and a previous image to maintain the association between the feature points in the images. Instead of calculating the difference in the position and orientation between each of the images and the image associated with each of the measurement points, processing of calculating the difference in the position and orientation between the latest image and the preceding image and applying the calculated difference to the current position and orientation information may be repeatedly performed.

To extract feature points in images as described above, a FAST algorithm is used in the present exemplary embodiment. Further, a known Kanade-Lucas-Tomasi (KLT) algorithm is used to track a feature point between images. Any other algorithm may also be used for the above-described feature point extraction and feature point tracking.

S1003 is a branch based on whether to terminate the processing of the position and orientation calculation thread.

If it is determined to terminate map data creation processing upon a user instruction or the like (YES in S1003), the thread is terminated. If it is not determined to terminate the map data creation processing (NO in S1003), the processing returns to S1002 to repeatedly perform the processing.

S1004 and S1005 are processing executed in the mapping thread.

In S1004, the mapping unit 904 determines whether it is necessary to add a new measurement point. If it is necessary to add a new measurement point, a new measurement point is generated. The new measurement point includes the last image acquired in S1002 and the position and orientation information.

Further, the mapping unit 904 extracts an image feature point that is not associated with the existing feature points in the environment from the image at the new measurement point and the image at the measurement point most recently used for position and orientation calculation in S1003. Then, the mapping unit 904 estimates three-dimensional coordinates of the image feature point that is consistent between the images based on the relative position and orientation between the images. Lastly, the information processing apparatus 301 adds the image feature point of which the three-dimensional coordinates are successfully estimated as a feature point in the environment to the map data, and adds the two-dimensional coordinates of the image feature point on each image corresponding to the feature point in the environment as observation information at each measurement point.

Further, the mapping unit 904 performs bundle adjustment processing between the new measurement point and the measurement point most recently used for position and orientation calculation in S1003, and adds the calculated relative position and orientation information to the pose graph. In this case, a measurement point on the movement path other than the measurement point most recently used for position and orientation calculation in S1003 may be included in the bundle adjustment processing. In addition, the relative position and orientation information calculated for a set of measurement points including the above-described measurement points may be added to the pose graph. In the case of updating the position and orientation at the measurement point and the positional information about the feature point in the environment based on a bundle adjustment result, the position and orientation at the measurement point other than the measurement point used for position and orientation calculation may be used as the reference for the position and orientation.

S1005 is a branch based on whether to terminate the processing of the mapping thread. If the processing of the position and orientation calculation thread is already finished (YES in S1005), the mapping thread is terminated. If the processing is not finished yet (NO in S1005), the processing returns to S1004 to repeatedly perform the processing.

S1006 and S1007 are processing executed in the map correction thread.

In S1006, the information processing apparatus 301 performs correction processing on the map data updated in the mapping thread. Map correction processing will be described in detail below.

S1007 is a branch based on whether to terminate the processing of the map correction thread. If the position and orientation calculation thread and the mapping thread are already finished (YES in S1007), the map correction thread is terminated. If the position and orientation calculation thread and the mapping thread are not finished yet (NO in S1007), the processing returns to S1006 to repeatedly perform the processing.

(Details of Map Correction Processing)

Figure 11:
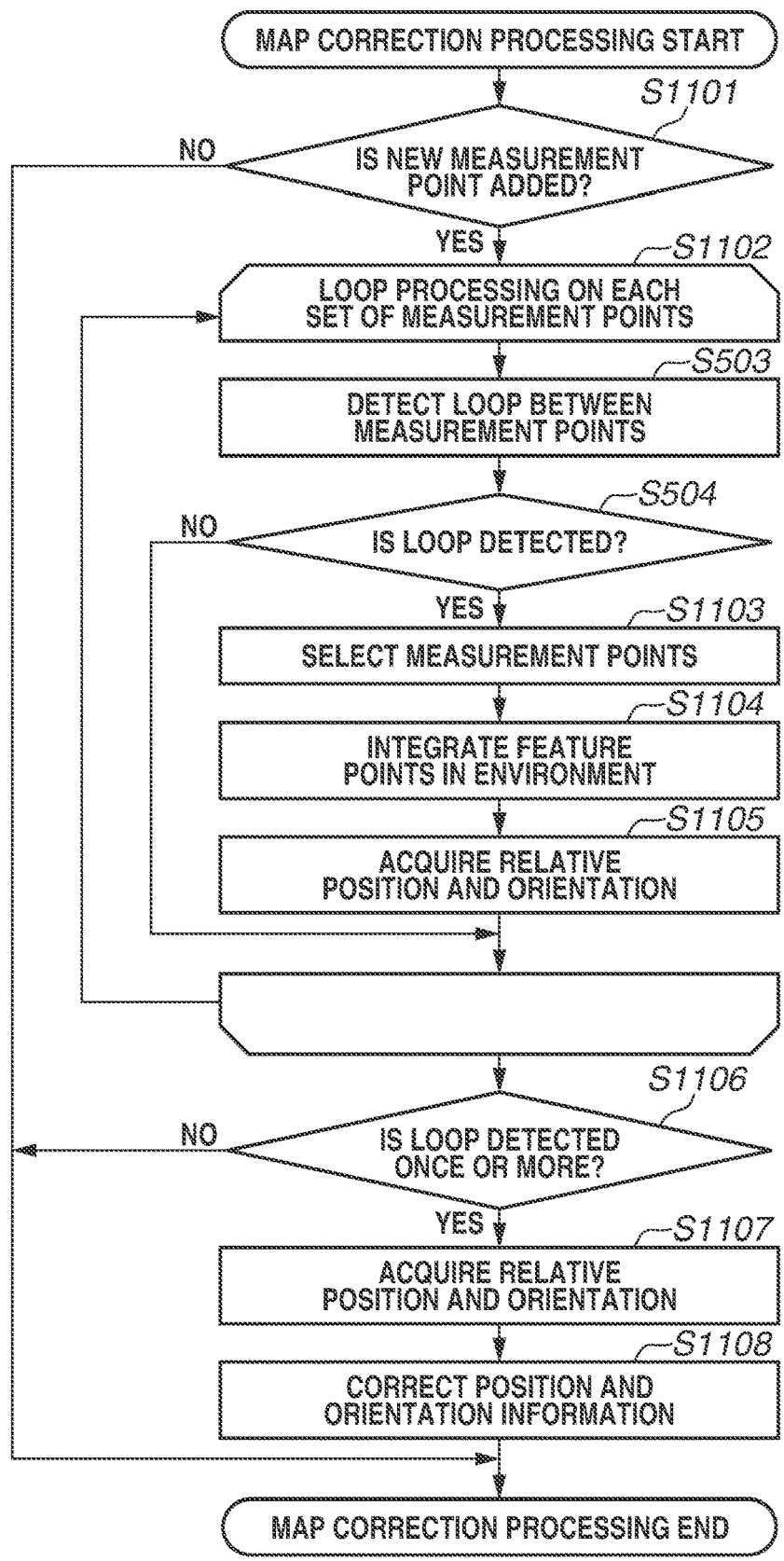
FIG. 11 is a flowchart illustrating a procedure of a map correction method according to the second exemplary embodiment.

The map correction processing in S1006 according to the present exemplary embodiment will be described in detail with reference to FIG. 11.

In S1101, it is determined whether a new measurement point has been added in S1004. If there is a measurement point that is added after the last determination, the processing of S1102 to S1106 is performed. If there is no measurement point added after the last determination, the map correction processing is terminated. In this case, measurement points are generated as illustrated in FIG. 1, and the measurement points I, J, and K are added during a period from the last determination to the current determination.

S1102 is a loop control in which processing of subsequent S503 to S506 is repeatedly performed on all sets of the new measurement point detected in S1101 and measurement points other than the new measurement point on the map data. The processing of S503 to S1104 is described using an example where the processing is performed on the set of the measurement points C and I in the repetitive processing.

S503 and S504 are similar to those of the first exemplary embodiment, and thus the descriptions thereof are omitted.

In S1103, the selection unit 403 selects a measurement points group for calculating an accurate relative position and orientation between measurement points from both sides of the movement path forming a loop. In the present exemplary embodiment, the selection unit 403 selects the measurement points C and I where a loop is detected and measurement points where a predetermined number or more of feature points in the environment that are common are observed on each movement path. In this case, an upper limit for the number of measurement points to be selected is set to reduce a load on the subsequent processing. If there are measurement points in number exceeding the upper limit as candidates on each movement path, measurement points are selected in descending order of the number of feature points in the environment that are common up to the upper limit. In this case, the upper limit for the measurement points to be selected on each movement path is set to 4. As a result, as illustrated in FIG. 6, the measurement points A to D are selected from the side of the measurement point C and the measurement points G to J are selected from the side of the measurement point I.

In S1104, the selection unit 403 integrates the feature point in the environment observed at each measurement point selected in S1103 with the feature point in the environment observed at each measurement point on the other movement path.

First, the selection unit 403 compares image features between feature points in the environment observed at measurement points (A to D in the example of FIG. 6) on one movement path and feature points in the environment observed at measurement points (G to J in the example of FIG. 6) on the other movement path. In this case, the selection unit 403 compares image features in sections where feature points in the environment are observed in the images at the respective measurement points based on the observation information. Patch matching is used to compare the image features. If it is determined that image features in both of the observed sections are sufficiently similar to each other, it is determined that the same object in the real space is referenced, and thus the feature points in two environments are integrated. The image feature comparison method is not limited to this example. For example, an Oriented FAST and Rotated BRIEF (ORB) feature amount or the like may be used.

Alternatively, the selection unit 403 may also use a method of integrating feature points in the environment between two measurement points (C and I in the example of FIG. 6) where a loop is detected prior to the selection of measurement points, and selecting measurement points where the integrated features in the environment are observed.

Figure 12:
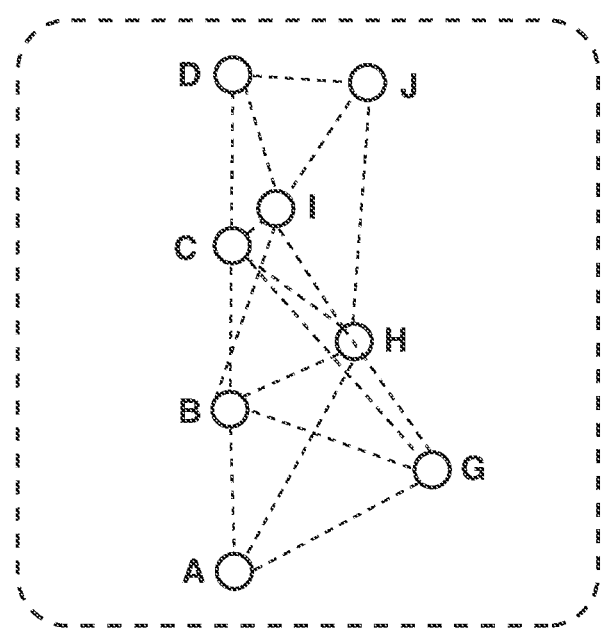
FIG. 12 illustrates an example of a result of first relative position and orientation acquisition processing according to the second exemplary embodiment.

In S1105, the first relative position and orientation acquisition unit 404 performs bundle adjustment processing on each of the measurement points selected in S1103 and the feature point observed at each of the measurement points, thereby calculating the relative position and orientation between the measurement points. FIG. 12 illustrates a state of the relative position and orientation between the measurement points obtained by the bundle adjustment processing.

S1106 is a branch based on whether a loop is detected once or more in S503. If a loop is detected (YES in S1106), the processing of subsequent S1107 and S1108 is performed.

If a loop is not detected (NO in S1106), the map correction processing is terminated.

In S1107, the second relative position and orientation acquisition unit 405 acquires, from the pose graph on the map data, a relative position and orientation that is not calculated in S1105 from among the relative positions and orientations between adjacent measurement points on all movement paths on the map data. In the example illustrated in FIG. 6, the relative position and orientation on the movement path including the measurement points A to D and the relative position and orientation on the movement path including the measurement points G to J are calculated in S1105, and thus the other relative positions and orientations between the measurement points D to G and between the measurement points J and K are acquired.

In S1108, the position and orientation correction unit 406 corrects the position and orientation information about each measurement point based on the relative positions and orientations acquired in S1105 and S1107. In this case, the position and orientation correction unit 406 uses the position and orientation at each measurement point other than the measurement point based on which the position and orientation is calculated as parameters to minimize a difference between the corrected relative position and orientation between measurement points and the relative positions and orientations acquired in S1105 and S1107. To minimize the difference, optimization processing using a technique, such as a known Newton's method or Levenberg-Marquardt method, is performed.

(Effects of Second Exemplary Embodiment)

The above-described processing according to the present exemplary embodiment makes it possible to generate environment map data with which highly accurate position and orientation estimation can be achieved even in a case where map data creation processing and correction processing are performed in parallel.

In the first and second exemplary embodiments, a grayscale camera is used as the sensor. However, the type of sensor to be used, the number of sensors to be used, and the fixation method for the sensor are not particularly limited. Any apparatus can be used as the sensor as long as the apparatus can continuously acquire luminance images or depth images of a surrounding environment of a moving object as digital data. For example, not only a grayscale camera, but also a camera for capturing color images, a depth camera, 2D-LIDAR, or 3D-LIDAR can be used. Further, a plurality of cameras may be arranged in different directions of the moving object. The number of times of acquiring information per second is not limited to 30 times.

In the first and second exemplary embodiments, a loop in a movement path is detected based on a similarity between images. However, the loop detection method is not limited to this method. For example, a distinguishable marker may be used on sensor information and a loop may be detected between measurement points where a common marker is detected.

In the first exemplary embodiment, measurement points are selected based on a state of adjacent measurement points on a movement path, and in the second exemplary embodiment, measurement points are selected based on a feature point in the environment that is observed in common. However, the measurement point selection method used by the selection unit 403 is not limited to this method. For example, measurement points may be selected based on an image similarity to the measurement points where a loop is detected, or based on a marker used to detect a loop.

While the second exemplary embodiment has been described using an example of the moving object externally operated by the user, the configuration of the moving object system 801 is not limited to this example. For example, a manned moving object that can be directly operated by the user riding on the moving object may be used. Alternatively, a moving object including a function of autonomous traveling on a preliminarily set route may be used. In this case, control information for the moving object system 801 may be generated based on map data and position and orientation information calculated by the position and orientation calculation unit 903, and the moving portions 806 may be driven via the control device 805, to thereby achieve autonomous traveling.

The second exemplary embodiment has been described using an example where wheels are used as the moving portions 806. However, for example, the moving portions 806 may have a configuration in which a plurality of propellers or the like is mounted and the moving object system 801 flies in the air and the sensor 803 observes in a direction of the ground surface.

Some embodiments are also implemented by executing the following processing. Specifically, software (program) for implementing functions according to the above-described exemplary embodiments is supplied to a system or an apparatus via a network or various storage media, and a computer (or a CPU, a micro processing unit (MPU), etc.) of the system or the apparatus reads and executes the program. The program can be provided by being recorded on a computer-readable recording medium.

According to an aspect of the present disclosure, it is possible to generate map data (three-dimensional map information) with which highly accurate position and orientation estimation can be achieved.

Other Embodiments

Some embodiments of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2021-037808, which was filed on Mar. 9, 2021 and which is hereby incorporated by reference herein in its entirety.

What is claimed is:

1. An information processing apparatus comprising:
at least one processor configured to function as:
an acquisition unit configured to acquire three-dimensional map information including a plurality of map elements corresponding to all movement paths of a moving object, each of the plurality of map elements including (i) sensor information obtained by a sensor mounted on the moving object and measuring an environment, and (ii) position and orientation information about the sensor, the position and orientation information being estimated based on the sensor information;
a detection unit configured to detect that the moving object has reached a location near a certain point a plurality of times based on the sensor information included in each of two map elements among the plurality of map elements, wherein each of the two map elements used to detect that the moving object has reached the location near the certain point the plurality of times belongs to a respective movement path of two movement paths among all the movement paths, and wherein the moving object has reached the location near the certain point one of the plurality of times in each of the two movement paths;
a selection unit configured to select map elements on each of the two movement paths, other than the two map elements, for a map elements group, the selected map elements including sensor information obtained by measuring an environment partially common to an environment measured to obtain the sensor information included in each of the two map elements used by the detection unit to detect that the moving object has reached the location near the certain point the plurality of times;
a first position and orientation acquisition unit configured to acquire, for each of the two map elements, a relative position and orientation between the map element on one of the two movement paths and each of the selected map elements on the other of the two movement paths based on the sensor information included in the selected map elements;
a second position and orientation acquisition unit configured to acquire relative positions and orientations between adjacent map elements of the plurality of map elements on all the movement paths;
a correction unit configured to correct the position and orientation information about the sensor included in each of the selected map elements corresponding to the two movement paths where the moving object has reached the location near the certain point the plurality of times based on the relative positions and orientations acquired by the first position and orientation acquisition unit and the relative positions and orientations acquired by the second position and orientation acquisition unit; and a control device configured to control movements of the moving object based on the corrected position and orientation information.

2. The information processing apparatus according to claim 1, wherein the selection unit additionally selects a map element adjacent to a selected map element on the movement paths of the moving object such that a maximum distance between the adjacent map element and the selected map element is more than or equal to a predetermined value.

3. The information processing apparatus according to claim 1,
wherein the three-dimensional map information includes feature point data in the environment that records a correspondence between three-dimensional positional information about at least one feature point in the environment observed by the sensor and each map element of a map elements group having three-dimensional positional information about the feature point in the environment observed by the sensor,
wherein the selection unit performs association on the feature point in the environment observed in the map elements on each of the two movement paths where the moving object has reached the location near the certain point one of the plurality of times, and
wherein the first position and orientation acquisition unit calculates the relative position and orientation of each of the map elements selected for the map elements group to reduce a reprojection error between the sensor information about each of the map elements and the feature point in the environment observed in each of the map elements.

4. The information processing apparatus according to claim 3, wherein the selection unit selects a map element in which a common feature point is observed based on the three-dimensional positional information about each of the map elements, the common feature point being observed in each of the two map elements used to detect that the moving object has reached the location near the certain point the plurality of times.

5. The information processing apparatus according to claim 3, wherein the selection unit selects a map element in which the feature point in the environment for which the association has been performed is observed.

6. The information processing apparatus according to claim 3, wherein the selection unit selects, for each of the two map elements used to detect that the moving object has reached the location near the certain point the plurality of times, a map element in which a feature point in the environment common to the feature point in the environment observed in each of the map elements is observed.

7. The information processing apparatus according to claim 1,
wherein the three-dimensional map information includes a pose graph on which a relative position and orientation between map elements is recorded, and
wherein the second position and orientation acquisition unit acquires the relative positions and orientations between the adjacent map elements from the pose graph.

8. The information processing apparatus according to claim 1, wherein the second position and orientation acquisition unit further calculates a relative position and orientation between the plurality of map elements in the three-dimensional map information based on position and orientation information about the plurality of map elements.

9. The information processing apparatus according to claim 1, wherein the correction unit uses, among relative positions and orientations between map elements acquired by the first position and orientation acquisition unit, a relative position and orientation between the map elements at a distance being more than or equal to a predetermined value.

10. The information processing apparatus according to claim 1, wherein the sensor is an image capturing apparatus, and the sensor information is an image.

11. An information processing method comprising:
acquiring three-dimensional map information including a plurality of map elements corresponding to all movement paths of a moving object, each of the plurality of map elements including (i) sensor information obtained by a sensor mounted on the moving object and measuring an environment, and (ii) position and orientation information about the sensor, the position and orientation information being estimated based on the sensor information;
detecting that the moving object has reached a location near a certain point a plurality of times based on the sensor information included in each of two map elements among the plurality of map elements, wherein each of the two map elements used to detect that the moving object has reached the location near the certain point the plurality of times belongs to a respective movement path of two movement paths among all the movement paths, and wherein the moving object has reached the location near the certain point one of the plurality of times in each of the two movement paths;
selecting map elements on each of the two movement paths, other than the two map elements, for a map elements group, the selected map elements including sensor information obtained by measuring an environment partially common to an environment measured to obtain the sensor information included in each of the two map elements used to detect that the moving object has reached the location near the certain point the plurality of times;
acquiring, as a first position and orientation acquisition, for each of the two map elements, a relative position and orientation between the map element on one of the two movement paths and each of the selected map elements on the other of the two movement paths based on the sensor information included in the selected map elements;
acquiring, as a second position and orientation acquisition, relative positions and orientations between adjacent map elements of the plurality of map elements on all the movement paths;
correcting the position and orientation information about the sensor included in each of the selected map elements corresponding to the two movement paths where the moving object has reached the location near the certain point the plurality of times based on the relative positions and orientations acquired in the first position and orientation acquisition and the relative positions and orientations acquired in the second position and orientation acquisition; and
controlling, by at least one processor, movements of the moving object based on the corrected position and orientation information.

12. A non-transitory computer-readable storage medium storing a program for causing a computer to execute an information processing method comprising:
acquiring three-dimensional map information including a plurality of map elements corresponding to all movement paths of a moving object, each of the plurality of map elements including (i) sensor information obtained by a sensor mounted on the moving object and measuring an environment, and (ii) position and orientation information about the sensor, the position and orientation information being estimated based on the sensor information;

detecting that the moving object has reached a location near a certain point a plurality of times based on the sensor information included in each of two map elements among the plurality of map elements, wherein each of the two map elements used to detect that the moving object has reached the location near the certain point the plurality of times belongs to a respective movement path of two movement paths among all the movement paths, and wherein the moving object has reached the location near the certain point one of the plurality of times in each of the two movement paths;

selecting map elements on each of the two movement paths, other than the two map elements, for a map elements group, the selected map elements including sensor information obtained by measuring an environment partially common to an environment measured to obtain the sensor information included in each of the two map elements used to detect that the moving object has reached the location near the certain point the plurality of times;

acquiring, as a first position and orientation acquisition, for each of the two map elements, a relative position and orientation between the map element on one of the two movement paths and each of the selected map elements on the other of the two movement paths based on the sensor information included in the selected map elements;

acquiring, as a second position and orientation acquisition, relative positions and orientations between adjacent map elements of the plurality of map elements on all the movement paths;

correcting the position and orientation information about the sensor included in each of the selected map elements corresponding to the two movement paths where the moving object has reached the location near the certain point the plurality of times based on the relative positions and orientations acquired in the first position and orientation acquisition and the relative positions and orientations acquired in the second position and orientation acquisition; and controlling movements of the moving object based on the corrected position and orientation information.

* * * * *